Oct. 24, 1944.   H. F. FRUTH   2,360,944
TESTING APPARATUS
Filed April 10, 1942
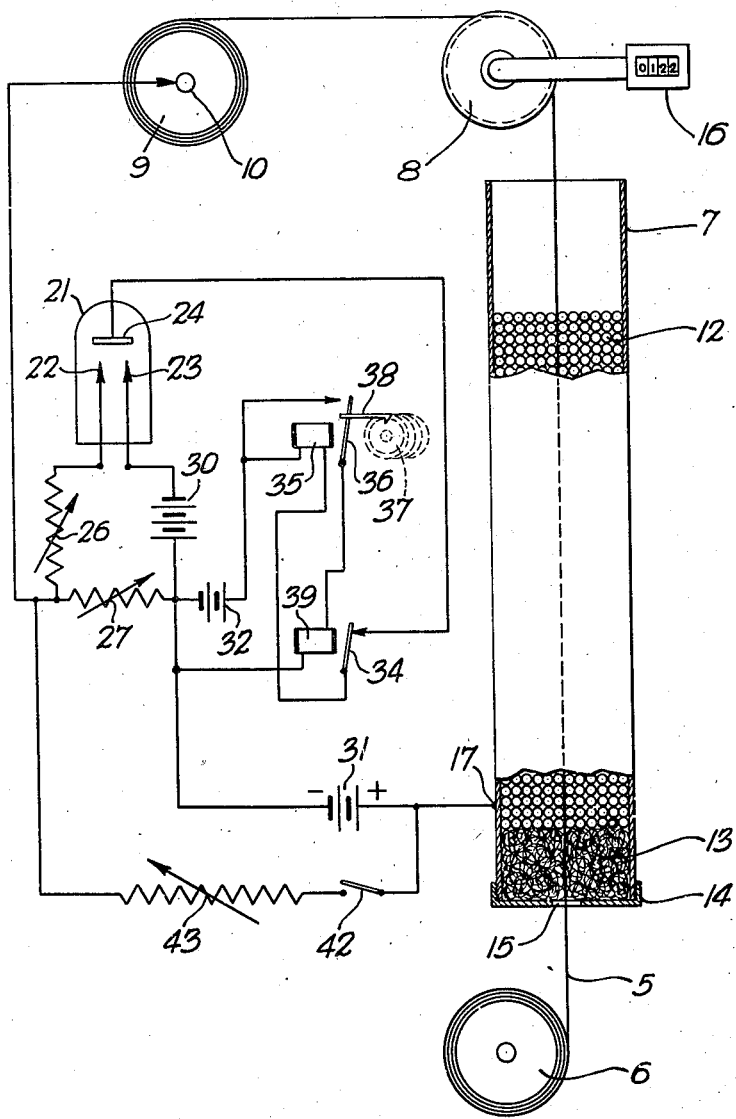
INVENTOR
H. F. FRUTH
BY Harry L. Duft
ATTORNEY Patented Oct. 24, 1944

2,360,944

UNITED STATES PATENT OFFICE 2,360,944

TESTING APPARATUS

Hal F. Fruth, Elmhurst, Ill., assignor to Western Electric Company, Incorporated, New York, N. Y., a corporation of New York Application April 10, 1942, Serial No. 438,451

1 Claim. (Cl. 177—311)

This invention relates to testing apparatus and more particularly to apparatus for determining the number of faults in the insulation of a given length of insulated wire.

In the manufacture of relay coils and other similar coils it is common practice to use insulated wire in which the insulation comprises a layer or layers of varnish or enamel applied to the wire. Such wire may be satisfactory for use in coils even though it has a small number of faults in its insulation. But if an excessive number of faults are present in the insulation of a length of wire, the wire is not satisfactory for use. It has, therefore, become an accepted practice to count the number of faults in the insulation of a known length of such wire and if the number is not too great to accept the wire for use.

An object of the present invention is to provide a simple and efficient testing apparatus for detecting the number of faults in the insulation of an insulated conductor.

In accordance with one embodiment of the invention, apparatus is provided which includes a metal tube filled with metal balls or shot which contact the surface of the insulated wire as it is drawn through the tube. The shot forms a contact for completing a circuit through bare spots or faults in the insulation on the wire and forms one of the terminals of the testing circuit, the other terminal of which is connected to the take-up reel on which the wire is wound. Upon the occurrence of a fault in the insulation, the shot contact will complete a circuit to actuate a counting register which will count the number of faults or holes in the insulation as the wire is reeled from one reel to another. A counter actuated by the wire measures the length thereof as the wire moves through the testing apparatus and the average number of pin holes per foot length of the wire may thus be obtained.

A better understanding of the invention will be had by reference to the accompanying drawing wherein the single figure shows schematically a testing apparatus embodying the features of the present invention.

Referring to the drawing, a wire 5 to be tested is shown being drawn from a supply reel 6 through a metal tube 7 and over a guide roller 8 to a take-up reel 9. The guide roller 8 drives a meter 16 for measuring the length of the wire as it is drawn from the supply reel to the take-up reel. The end of the wire is preferably stripped of insulation and connected to the core 10 of the take-up reel. The metal tube is filled with a quantity of shot 12, preferably coated with gold, silver or platinum, or other conducting material. Glass balls similarly coated or carbon globules might be used instead of shot. The shot is retained in the tube by felt or sponge rubber 13 at the lower end of the tube. A collar 14 is provided to support the felt or sponge rubber and has an aperture 15 to permit free passage of the wire to be tested. The amount and size of the shot to be used depends on the desired severity of the test, a larger quantity and smaller shot being used to increase the severity or sensitivity. Increasing the amount of shot increases the pressure exerted by the shot on the insulation of the wire, while reducing the size of the shot and maintaining the same volume not only increases the number of shot but also increases the sensitivity of the shot to smaller holes in the insulation or to projections through the insulation. Reducing the speed with which the wire is drawn through the tube also increases the severity of the test.

The core 10 of the take-up reel is connected to a cathode 22 of a three element cold cathode tube 21 through a variable resistance 26, the core being of metal and provided with a brush, or slip ring, or other suitable contacting device (not shown). The cathode tube used is a trigger type space discharge tube and will not ionize with less than a certain voltage impressed across the cathodes thereof. A second cathode 23 of the tube 21 is connected through a battery 30 to a battery 31, the other side of which is connected to the metal tube by a terminal 17. Battery 30 is also connected to cathode 22 through a variable resistance 27 and the variable resistance 26.

When the insulation on the wire moving through the metal tube is imperforate, the shot will not contact the bare wire and there will be insufficient voltage impressed across the cathodes 22 and 23 of the tube 21 to cause the tube to ionize. However, upon the occurrence of a fault, that is, a bare spot in the insulation, the circuit through the wire from the battery 31 to the cathode 22 will be closed, thus increasing the voltage across the cathodes. If the fault is serious enough to lower the resistivity of the insulation at that point enough to permit sufficient voltage to pass to ionize the tube, then current will flow from a third battery 32 connected through the battery 30 to the cathode 23 to an anode 24 of the tube 21, and finally through a normally closed switch 34 to energize an electromagnet 35. This electromagnet closes a switch 36 associated therewith and at the same time operates a counting mechanism 37 by a pawl 38 which is used to indicate the number of faults in the wire. Simultaneously a circuit to a second electromagnet 39 is closed. This electromagnet opens the normally closed switch 34 thus breaking the circuit to the electromagnet 35. Breaking the circuit to the magnet 35 causes the normally open switch 36 to reopen, thus breaking the circuit to the electromagnet 39. This completes one cycle of operation. The electromagnet 35 is of the delayed action type and it has been found that, with a time delay of one one-thousandth of a second, apparatus of this type is capable of registering as high as 600 faults per minute.

The sensitivity or severity of this testing apparatus may be adjusted through a checking circuit provided by a normally open switch 42 and a variable resistance 43. The resistance 43 is calibrated and by closing the switch 42 it is possible to determine at what resistance the tube will ionize and operate the fault counter. It will also be apparent that a critical resistance point having been selected at which it is desired that the counting mechanism be actuated, it is merely necessary to set the calibrated variable resistance 43 to the desired resistivity, close the switch 42, and then to adjust the variable resistances 26 and 27 until the tube will just ionize at that resistivity. In this way the testing apparatus may be controlled so as to detect and register only faults of a predetermined resistivity.

By using two batteries in the cathode circuit, the larger being always connected across the cathodes while the smaller is connected only when the circuit is completed through the shot and the conductor, it is possible to have a low potential between the shot and the conductor while at the same time obtaining the necessary current to operate a space discharge tube of the desired type. A low potential may be highly desirable in testing thin insulation where a higher voltage would puncture the insulation and operate the fault counter, although the insulation might be adequate for many purposes. Higher voltages may, of course, be used, as may be desired, merely by increasing the size of the battery 31.

While but one embodiment of this invention has been shown and described, it will be understood that many changes and modifications may be made therein without departing from the spirit or scope of the present invention.

What is claimed is:

In a testing apparatus for testing insulation on a conductor, a container of conducting material having an aperture in the bottom thereof, a quantity of shot in said container, a bed of deformable material in the bottom of said container for retaining the shot therein, said shot having a coating of noble metal, means for drawing an insulated conductor through said container so as to engage said shot, and means responsive to the shot contacting the conductor for indicating a fault in the insulation.

HAL F. FRUTH.